United States Patent
Schrewe et al.

(10) Patent No.: US 8,152,912 B2
(45) Date of Patent: Apr. 10, 2012

(54) METHOD FOR DETERMINING THE CHARGE STATE OF A PARTICLE FILTER INSTALLED IN THE EXHAUST GAS LINE OF AN INTERNAL COMBUSTION ENGINE AND DEVICE FOR REDUCING THE PARTICLE EMISSIONS OF AN INTERNAL COMBUSTION ENGINE

(75) Inventors: Klaus Schrewe, Rüthen (DE); Rüdiger Mandt, Breckerfeld (DE)

(73) Assignee: HJS Emission Technology GmbH & Co. KG, Menden (DE)

( * ) Notice: Subject to any disclaimer, the term of this patent is extended or adjusted under 35 U.S.C. 154(b) by 0 days.

(21) Appl. No.: 12/922,842

(22) PCT Filed: Mar. 6, 2009

(86) PCT No.: PCT/EP2009/052663
§ 371 (c)(1),
(2), (4) Date: Oct. 5, 2010

(87) PCT Pub. No.: WO2009/115415
PCT Pub. Date: Sep. 24, 2009

(65) Prior Publication Data
US 2011/0036070 A1     Feb. 17, 2011

(30) Foreign Application Priority Data
Mar. 15, 2008 (DE) .......................... 10 2008 014 528

(51) Int. Cl.
*B01D 46/46* (2006.01)
(52) U.S. Cl. .............. 96/421; 96/422; 55/523; 55/385.3

(58) Field of Classification Search ............ 55/522–524; 422/169–172, 177–182; 60/274, 295, 297; 95/20, 19, 23; 30/274, 295, 297; 96/417, 96/420, 422
See application file for complete search history.

(56) References Cited

U.S. PATENT DOCUMENTS
4,281,512 A * 8/1981 Mills ............................... 60/311
(Continued)

FOREIGN PATENT DOCUMENTS
WO    WO2008036010 A1 *    3/2008

OTHER PUBLICATIONS
Written Opinion of the International Searching Authority (English translation), PCT/EP2009/052663.
(Continued)

*Primary Examiner* — Duane Smith
*Assistant Examiner* — Amber Orlando
(74) *Attorney, Agent, or Firm* — Margaret Polson; Oppedahl Patent Law Firm LLC

(57) ABSTRACT

A method for determining the charge state of a particle filter installed in the exhaust gas line of an internal combustion engine comprises the following steps: determining the exhaust gas volumetric flow in the flow direction of the exhaust gas downstream of the particle filter (2), detecting the pressure present in the exhaust gas line (1) in the direction of flow of the exhaust gas prior to the particle filter (2), comparing the exhaust gas volumetric flow determined hinter the particle filter (2) with the detected pressure present upstream of the particle filter (2) and evaluating the results of the comparison with consideration to the exhaust gas back pressure of the uncharged particle filter (2) and the exhaust gas back pressure caused by the particle filter charge, said pressure being higher than the uncharged filter. Further described is a corresponding device for reducing the particle emissions of an internal combustion engine.

5 Claims, 1 Drawing Sheet

U.S. PATENT DOCUMENTS

| | | | |
|---|---|---|---|
| 4,329,162 A * | 5/1982 | Pitcher, Jr. | 55/523 |
| 4,492,079 A * | 1/1985 | Takagi et al. | 60/274 |
| 4,530,418 A | 7/1985 | Currie | |
| 4,552,059 A * | 11/1985 | Potter | 454/66 |
| 4,603,550 A * | 8/1986 | Shinzawa | 60/274 |
| 4,835,963 A * | 6/1989 | Hardy | 60/274 |
| 6,539,813 B1 * | 4/2003 | Horiuchi et al. | 73/861.53 |
| 6,865,472 B2 * | 3/2005 | Nakamura | 701/108 |
| 6,901,751 B2 * | 6/2005 | Bunting et al. | 60/297 |
| 7,029,510 B2 | 4/2006 | Frankle et al. | |
| 7,468,085 B2 | 12/2008 | Goddard | |
| 7,552,584 B2 | 6/2009 | Wang | |
| 7,581,389 B2 * | 9/2009 | Crawley et al. | 60/297 |
| 2004/0123589 A1 * | 7/2004 | Ohtake et al. | 60/295 |
| 2004/0159099 A1 * | 8/2004 | Kuboshima et al. | 60/297 |
| 2004/0194450 A1 * | 10/2004 | Tanaka et al. | 60/285 |
| 2004/0200198 A1 * | 10/2004 | Inoue et al. | 55/282.3 |
| 2005/0056005 A1 * | 3/2005 | Otake et al. | 60/295 |
| 2005/0188686 A1 * | 9/2005 | Saito et al. | 60/297 |
| 2005/0188771 A1 * | 9/2005 | Lund Bo et al. | 73/861 |
| 2005/0217250 A1 * | 10/2005 | Kuboshima et al. | 60/287 |
| 2006/0005534 A1 * | 1/2006 | Wirth et al. | 60/291 |
| 2006/0032217 A1 * | 2/2006 | Kondou et al. | 60/297 |
| 2007/0056271 A1 * | 3/2007 | Berryhill et al. | 60/297 |
| 2007/0119172 A1 * | 5/2007 | Barbe et al. | 60/605.2 |
| 2008/0053074 A1 | 3/2008 | Verkiel | |
| 2009/0165566 A1 * | 7/2009 | Peters et al. | 73/861.55 |
| 2010/0132339 A1 * | 6/2010 | Barkhage | 60/287 |

OTHER PUBLICATIONS

International Search Report (English translation), Jul. 2009, PCT/EP2009/052663.

International Preliminary Report on Patentability, Sep. 2010, PCT/EP2009/052663.

* cited by examiner

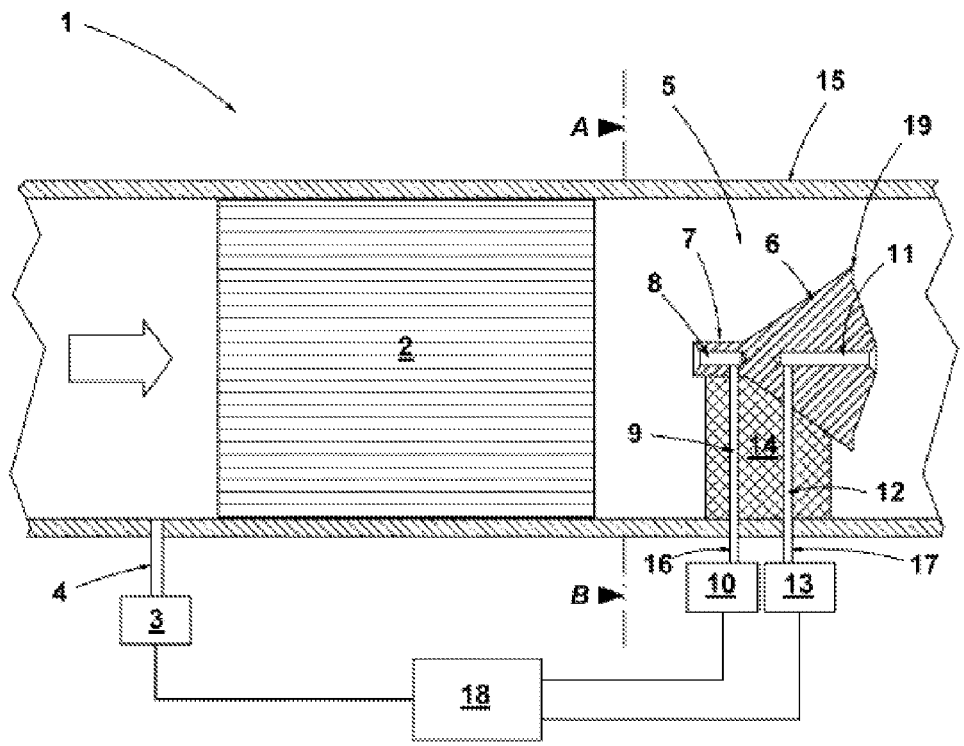
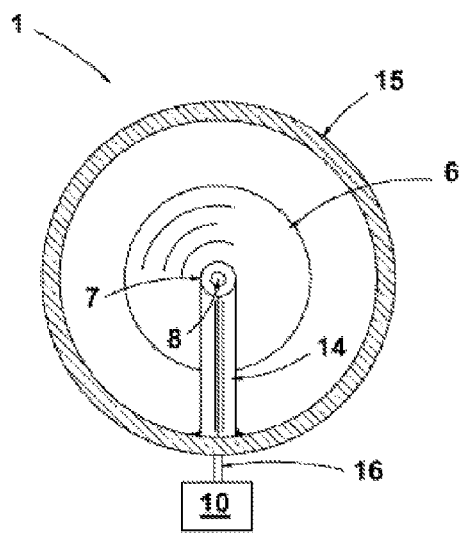
Fig. 1
Fig. 2

METHOD FOR DETERMINING THE CHARGE STATE OF A PARTICLE FILTER INSTALLED IN THE EXHAUST GAS LINE OF AN INTERNAL COMBUSTION ENGINE AND DEVICE FOR REDUCING THE PARTICLE EMISSIONS OF AN INTERNAL COMBUSTION ENGINE

CROSS REFERENCE APPLICATIONS

This application is a National Stage entry of PCT/EP2009/052663 filed Mar. 6, 2009 which claims priority from German application number 102008014528 filed Mar. 15, 2008.

FIELD OF THE DISCLOSURE

The disclosure relates to a method for determining the soot charge state of a particle filter installed in the exhaust gas line of an internal combustion engine, in particular a diesel engine. The disclosure further relates to a device for reducing the particle emissions of an internal combustion engine, in particular a diesel engine. The device comprises a particle filter installed in the exhaust gas line of an internal combustion engine having a device for determining the soot charge state of the particle filter.

BACKGROUND

Particle filters are installed in the exhaust gas line of diesel engines to collect any particulate matter conveyed in the exhaust gas flow, particularly soot particulates. Such particle filters must be cleaned periodically to prevent accumulated soot on the particulate filter excessively increasing the exhaust gas backpressure, which impairs the efficiency of the diesel engine. Soot oxidation, also called soot combustion is use free the particle filter surface facing the incoming flow from the accumulated soot particles. The soot combustion can either be triggered, or it can occur spontaneously if suitable conditions exist. The latter occurs if the exhaust gas temperature flowing into the particle filter is higher than the soot ignition temperature, and if a sufficient quantity of oxygen is exists in the exhaust gas flow.

To ensure that a sufficient soot quantity has accumulated on the particle filter surface facing the incoming flow, regenerating the particle filter by triggering a soot oxidation should only occur when the particle filter has a certain soot charge state. This ensures that the desired oxidation proceeds as required. If the soot oxidation process is triggered when there is insufficient soot accumulation on the particle filter, the soot oxidation could be incomplete, causing the problems noted above. For this reason, before the regeneration of the filter is initiated, a determination of the soot charge state of the particle filter is normally done in connection with active regeneration processes. The pressure is typically measured in the exhaust gas flow upstream and downstream of the particle filter in order to detect the soot charge state of the particle filter. By observing the pressure differential and the air and fuel quantity fed into the internal combustion engine, the actual soot charge state of the particle filter can be determined depending on the respective characteristic curves of the internal combustion engine. The characteristic data of the engine are required to be able to determine the charge state of a particle filter installed in an exhaust gas line of an internal combustion engine, in particular a diesel engine, in this manner. For this reason, this method is difficult to use for retrofit purposes or for small run series, because each system must be adapted to the respective characteristic data of the engine.

This method is also considered disadvantageous because the air quantity fed into the internal combustion engine for the combustion process must be measured, and because there is not always sufficient space available to install such volumetric air flow metering unit.

The foregoing example of the related art and limitations related therewith are intended to be illustrative and not exclusive. Other limitations of the related art will become apparent to those of skill in the art upon a reading of the specification and a study of the drawings.

Based on this discussed prior art, the purpose of the invention is to develop or further develop the method mentioned at the outset and the device mentioned at the outset in such a way that the soot charge state of a particle filter installed in the exhaust gas line of an internal combustion engine and the air volume fed into the internal combustion engine can also be detected irrespective of whether the engine characteristic data are available.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

The invention teaches that this problem is solved by the method mentioned at the outset, with the following steps:
 determination of the volume flow of the exhaust gas in the direction of flow of the exhaust gas downstream of the particle filter,
 detecting the pressure prevailing upstream of the particle filter in the exhaust gas line in the direction of flow of the exhaust gas,
 comparing the volumetric flow of the exhaust gas determined downstream of the particle filter in the direction of the flow with the pressure detected upstream of the particle filter and
 evaluating the results of the comparison taking into account the exhaust gas backpressure of the uncharged particle filter and the pressure caused by the particle filter soot charge, compared to the higher exhaust gas backpressure of the uncharged filter.

The device relevant problem is solved by the generic device mentioned at the outset, in which the device for determining the charge has a pressure sensor located upstream of the particle filter in the direction of the flow of the exhaust gas for measuring the pressure prevailing in the exhaust gas line, as well as a volumetric flow sensor located downstream of the particle filter in the direction of the flow of the exhaust gas, in which both said sensors for evaluating the measuring result are connected to a control unit.

With this method, the same is applicable for the device described earlier, a volumetric flow measurement and/or determination is performed within the exhaust gas flow, namely downstream of the particle filter in the direction of the exhaust gas flow. Arranging the volumetric flow measurement sensor within the exhaust gas line has the advantage that this requires barely any additional installation space. Moreover, the volumetric flow measurement sensor and/or its measuring body is not subject to any contamination because of its placement downstream of the particle filter. Said measurement sensor is protected against contamination because of the upstream particle filter. The volumetric exhaust gas flow and the prevailing pressure in the exhaust gas line upstream of the particle filter are detected, preferably simultaneously or virtually simultaneously. By comparing the measured values, the exhaust gas backpressure that is caused by the current soot charge of particle filter in the system can be determined. By the determination of the exhaust gas volumetric flow downstream of the particle filter not only the exhaust gas volumetric flow is determined, but also, as part of that, the static pressure is detected. This result is evaluated, taking into account the exhaust gas backpressure caused by the uncharged particle filter. The exhaust gas backpressure of a specific uncharged particle filter is known quantity.

The evaluation is performed taking into account this value with respect to the portion of the exhaust gas backpressure that has to be accounted for due to the soot charge of the particle filter. In this case it is also considered that if the particle filter is charged with soot, the exhaust gas backpressure provided by the particle filter is greater than with an uncharged particle filter. This proportion of exhaust gas backpressure in turn is a measure for the soot charge of the particle filter and therefore for the quantity of soot that has accumulated on the particle filter surface facing the incoming flow. Therefore, in this manner, the soot charge state can be determined without having to determine the engine characteristic data or having to determine the volumetric flow of the air flow feed into the internal combustion engine. In order to have measured values available for such evaluation which can be associated to one and the same filter charge state, the detection of the volumetric flow and the detection of the pressure are preferably performed simultaneously or virtually simultaneously, but in any case expediently only at such time interval from each other, in which the respective soot accumulation rate that corresponds to the respective operating state of the internal combustion engine can be based upon an essentially unchanged soot charge.

The correction quantity used in the evaluation is the exhaust gas backpressure associated with the uncharged particle filter. Since this can change due to ash accumulation as a result of filter regeneration processes performed over the course of time, it can be provided that these are corrected or recalibrated either at time intervals or conjoined to specific operating conditions.

In order to achieve a certain measured value redundancy and thus achieve an improved quality of the result of the charge state determination, it can be provided that multiple determinations of the exhaust gas volume and correspondingly multiple pressure determinations are performed prior to the evaluation, in which case the respective mean values or also weighted mean values are used in the evaluation. Weighting of the mean values can also be done depending on the determined exhaust gas volumetric flow, since at a higher exhaust gas volumetric flow a higher measuring accuracy can be achieved, for instance when the internal combustion engine is operated under load. It is also possible to perform multiple evaluations and incorporate their mean value or weighted mean value in making a decision for triggering certain actions.

In addition to determining the exhaust gas volumetric flow and measuring the pressure, the temperature is also preferably recorded in order to be able to correct the measured value received with respect to the prevailing temperature in the exhaust gas line.

The described method and the described device are suitable for use within the scope of active particle filter regeneration strategies Likewise, this method or this device can also be used for checking or monitoring the charge state of particle filters with passive regeneration strategies. In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

FIG. 1 is a schematic longitudinal section through the exhaust gas line of a diesel engine with a particle filter and a device for determining the charge state of the particle filter.

FIG. 2 is a cross section through the exhaust gas line along line A-B.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

FIG. 1 is a segment of an exhaust gas line 1 connected to a diesel engine (not shown), with a particle filter 2 is arranged inside. The particle filter 2 is used for filtering the exhaust gases emitted by the diesel engine. Any particulate matter that exists in the exhaust gas flow, in particular soot particles, are retained by the particle filter 2. Such filters are commonly known.

In order to regenerate the particle filter 2 at time intervals by initiation of a soot oxidation, a device for determining the charge state of the particle filter 2 is attached to the exhaust gas line 1. This device determines the accumulated soot quantity on the incoming flow side of the particle filter 2. This device comprises a pressure sensor 3, which is upstream of the particle filter 2 in the direction of the exhaust gas flow (indicated by a large arrow in FIG. 1).

The pressure sensor 3 is arranged in order to measure the static pressure in the section of the exhaust gas line which is upstream of the particle filter 2. For this reason, the pressure sensor 3 is arranged outside of the exhaust gas line and is connected with the exhaust gas line by a measuring tube 4. The device for determining the also has a volumetric flow sensor 5 which is downstream of the particle filter 2 in the direction of the flow of the exhaust gas. The volumetric flow sensor 5 has a measuring cone 6 which serves as a measuring body, in which two measuring points are arranged. With respect to the measuring cone 6, in the illustrated embodiment has an axially symmetric body, a longitudinal section of which is shown in FIG. 1. The measuring cone 6 has an actual cone inclined opposite to the direction of flow of the exhaust gas, using a cylindrical extension 7, as can be seen in FIG. 1. This in turn contains a blind hole 8, which in turn is connected to a pressure sensor 10 by a measuring channel 9. The pressure sensor 10 is used for detecting the dynamic pressure which is formed in the blind hole 8 when the exhaust gas is flowing and thus for detecting the total pressure provided by the exhaust gas flow. A further blind hole 11 is inserted in the downstream area of the measuring cone 7. This is connected to another pressure sensor 13 by the measuring channel 12. Since the measuring point of the pressure sensor 13 located inside of the blind hole 11 is located in the no-flow zone of the exhaust gas flowing through the exhaust gas line, this location is used for measuring the prevailing static pressure on the downstream side with respect to the particle filter 2.

In the illustrated embodiment, the measuring body 6 is held on the exhaust gas line 1 in the section that shows the tube 15 by means of a support body 14. The support body 14 is welded to the inside of the tube 15. The two bores forming the measuring channels 9, 12, are arranged in the support body 14. The measuring channels 12, 13 respectively, continue outside of the tube 15 in measuring tubes 16 and/or 17 before the actual pressure sensor 10 and/or 13 is connected. The pressure sensors 3, 10, 13, are all arranged outside of the exhaust gas line 1 and output their measuring signals to a control unit 18, typically a microprocessor. The control unit 18 evaluates the measured values provided from the pressure sensors 3, 10, 13, pursuant to a predetermined algorithm. In addition, a temperature measuring device, which is not shown in FIG. 1, is connected to the control unit 18, which is used for detecting the temperature prevailing in the exhaust gas line 1. The temperature is used as a correction quantity within the scope of the evaluation of the measured values received.

The measuring cone 6 illustrated in FIG. 1 has an effective fluidic trailing edge 19, which is used to generate turbulence and therefore positively assists the collection of measured values through the volumetric flow sensor 5, i.e. with respect to the measuring point associated with the blind hole 11 for detecting the static pressure.

The suspension of the conical body 6 inside of tube 15 can be seen in the cross-section shown in FIG. 2.

In order to determine the soot charge state of the particle filter 2, the pressure sensor 3 detects the prevailing static pressure upstream of particle filter 2 inside of the exhaust gas line 1. The volumetric flow sensor 5 measures the volumetric exhaust gas flow simultaneously or virtually simultaneously. This is performed by detecting the total pressure with the pressure sensor 10 and the static pressure with the pressure sensor 13. The measured values determined upstream of the particle filter 2 and downstream of said particle filter can be compared with each other immediately, provided that an energetically equivalent level prevails upstream and downstream of the particle filter within the exhaust gas flow. The result of the comparison which is determined as part of a subtraction, for example, is evaluated with respect to the exhaust gas backpressure generated by the particle filter 2 and its soot charge. Since the exhaust gas backpressure of the particle filter 2 uncharged by soot is known, the proportion of the measured exhaust gas backpressure to be associated to the soot charge can be determined easily. Since the exhaust gas backpressure to be associated to the soot charge of the particle filter 2 is proportional to the accumulated soot quantity on the inflow side of the particle filter 2, one obtains a value which reflects the accumulated soot quantity in this manner. Depending on the use of the device for determining the soot charge within the scope of the utilized exhaust gas cleaning system, actions can be or not be triggered by the control unit 18, depending on the level of soot charge determined. A heating device that is not shown in the embodiment illustrated in FIG. 1 is connected to the control unit 18, which can be used to increase the temperature on the inflow side to trigger a filter regeneration. If the detected soot charge state of the particle filter exceeds a predetermined threshold value, the heating device is triggered resulting in a desired soot combustion occurring and regenerating the particle filter 2. The threshold value is selected such that if it is exceeded, a complete filter regeneration is extremely likely to be performed. Pursuant to the embodiment described above, the filter regeneration will start immediately if a sufficient soot charge is detected. The signal of the evaluation unit after the detection of this charge state thus represents a regeneration signal. In an alternative embodiment, in addition to that regeneration signal provided by this method, it can be provided that appropriate signals of further parameters which influence the triggering of a soot regeneration can be included in the evaluation, such as the current operating state of the engine, or the current driving characteristics.

The value of the exhaust gas backpressure of the uncharged particle filter being used in the evaluation changes while the exhaust gas cleaning system is operational. Since this value will increase as a result of successive ash accumulation, a further soot charge state determination can be performed after some or all filter regenerations, in order to obtain the actual exhaust gas backpressure value of the regenerated and therefore uncharged particle filter. Therefore, within the scope of these explanations, the term "uncharged particle filter" must be understood to be not only the brand-new particle filter and the exhaust gas backpressure provided by same, but also the particle filter whose exhaust gas backpressure has increased because of ash deposits within the course of its service life. Such a calibration can, depending on the configuration of the exhaust gas cleaning system and/or the exhaust gas cleaning strategy, be limited to such filter regenerations, whose system is designed such that it is highly probable that the filter generation was performed completely and consequently the entire or virtually the entire accumulated soot on the inflow surface of the particle filter was oxidized.

The figures are merely an example to describe one embodiment of the invention. Also other embodiments are conceivable, especially with respect to the design of the volumetric flow sensor and/or its measuring body. For this reason, there is no problem in using also a sheet metal body instead of the measuring cone 6 that is shown in the Figures, which is used to provide a measuring point for the dynamic pressure and one measuring point for the static pressure that is located in the no-flow zone.

The specification of the invention makes it clear that the described methods as well as the described device can particularly also be implemented in the exhaust gas line of such diesel combustion engines, in which an interface to the engine management 15 and/or for the detection of engine specific characteristics is either not provided or is not possible. This method and this device therefore involves systems which can be operated self-sufficiently. This is one reason, why this method and this device is particularly suitable for retrofitting also for combustion engines of machines.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true sprit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The above definitions are provided to clarify their specific use in the context of the invention.

LIST OF REFERENCE SYMBOLS

1 Exhaust gas line
2 Particle filter
3 Pressure sensor
4 Measuring tube
5 Volumetric flow sensor
6 Measuring cone
7 Cylindrical extension
8 Blind hole
9 Measuring channel
10 Pressure sensor
11 Blind hole
12 Measuring channel
13 Pressure sensor
14 Support body
15 Tube
16 Measuring tube
17 Measuring tube
18 Control unit
19 Trailing edge

The invention claimed is:

1. A device for reducing the particle emissions of an internal combustion engine, in particular a diesel engine, comprising:
    a particle filter installed in the exhaust gas line of the internal combustion engine;
    a device for determining the soot charge state of the particle filter, the device for determining the charge state having a pressure sensor arranged in the exhaust gas line in a direction of flow of the exhaust gas upstream of the particle filter for detecting the prevailing pressure in the exhaust gas line and a volumetric flow sensor arranged downstream of the particle filter in the direction of the flow of the exhaust gas,
    wherein the volumetric flow sensor comprises a measuring cone arranged in the exhaust gas line, a longitudinal axis of the measuring cone being parallel to a longitudinal axis of the exhaust gas line in this section; the measuring cone arranged with a conical surface facing the direction of flow of the exhaust gas in the exhaust gas line, wherein one measuring point for measuring the dynamic pressure in the center of the cone is located opposite to the direction of flow of the exhaust gas, and one measuring point for measuring the static pressure is located in the no-flow zone of the measuring cone; and
    wherein two sensors for evaluating measured results are connected to control a unit.

2. The device of claim 1, wherein the measuring points in both connected by means of a measuring channel with a pressure sensor arranged outside of the exhaust gas line.

3. The device of claim 2, wherein the measuring cone is held by a body forming the measuring channel(s) within the exhaust gas line.

4. The device of claim 3, wherein the measuring channels are arranged in a support body which holds the measuring cone in the exhaust gas line.

5. The device of claim 1, wherein the measuring cone further comprises an effective fluidic trailing edge on its largest diameter that determines the radial termination.

* * * * *